F. MÜLLER.

Tassel-Clips for Window-Shades.

No. 5,338. Reissued March 25, 1873.

WITNESSES.

F. P. Wentworth
John P. McEloy

INVENTOR.

Frederick Müller
per
Brown Brothers
Attorneys.

UNITED STATES PATENT OFFICE.

FREDERICK MÜLLER, OF BOSTON, MASSACHUSETTS.

IMPROVEMENT IN TASSEL-CLIPS FOR WINDOW-SHADES.

Specification forming part of Letters Patent No. 85,953, dated January 19, 1869; reissue No. 5,338, dated March 25, 1873.

*To all whom it may concern:*

Be it known that I, FREDERICK MÜLLER, of Boston, in the county of Suffolk and State of Massachusetts, have invented a certain new and useful Improved Window-Shade Tassel-Clip; and that the following is a full, clear, and exact description of the same, reference being had to the accompanying plate of drawing.

This invention more particularly relates to that class of clasps for attaching cords and tassels to window-curtains, employing two jaws or plates adapted to open from and close upon each other, and thus, when applied to the curtain-stick, to seize and embrace the same on both sides; and the invention consists in a clasp, of the class stated, that has the outer end of each and both of its jaws or plates constructed with an inward-projecting flange or lip for embracing the upper or thin edge of the curtain-stick, thus interlocking the clasp and stick together without defacing the curtain or stick. In addition to the above, the invention consists in an improved construction of the clasps, whereby, in their manufacture, the use of rivets or solder are avoided, and the clasp can be securely attached without the use of screws or nuts of any kind.

Figure 1:
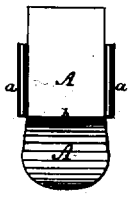
Figure 2:
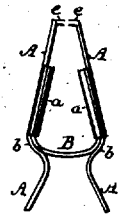
Figure 3:
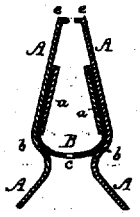
Figure 4:
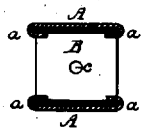
Figure 4:
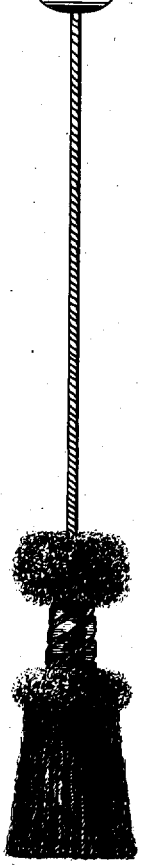

In the accompanying plate of drawing my invention is illustrated, Figures 1 and 2 being side views; Fig. 3, a vertical section of the clasp; Fig. 4, a horizontal section; and Fig. 5, a view of the clasp as connected with a tassel by its line or cord.

Figure 5:
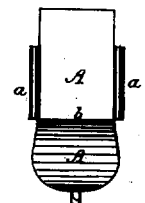

A A in the drawing represent the two jaws or plates of the clasp, between which a flat metal spring, B, is located, which spring is bent into the form of a letter U, and has its two ends slightly drawn inward. (See Fig. 3.) This spring B is secured against the inner face of each of the two jaws A by lapping over the spring B at each of its edges or sides a lip, *a*, which projects from the jaws A at each side or edge thereof, as represented in Figs. 1 and 5. Each jaw A, at *b*, is slightly curved under the spring B, which, together with the overlapping of its edges by the lips *a* of the jaws A, prevents the parts from becoming detached. *c*, a hole in center of spring B for receiving the tassel-cord, which cord is passed through it and secured by tying or otherwise.

Under the construction above described the spring-plate B is the hinge of the jaws, and from its spring action the jaws automatically will close upon each other or upon whatever is placed between them, and thus caused to tightly grasp a curtain-stick, should they be applied to the same.

The outer end of each jaw A has an inward-projecting lip or flange, *e*, which lips, when the clasp is applied to a curtain stick or bar, hook over the upper or thin edge of the bar, the lower or thick edge and the two sides or faces of the bar being surrounded or embraced by the inner faces of the plates A and the curved spring-plate B. The jaws A extend somewhat in length beyond the plane of location of the hinge-spring B, forming ends, by pressing on which the outer ends of the jaws A, having the lips *e*, as described, can be opened from each other for removal from the curtain bar or stick.

A clasp constructed with the lips *e*, as described, in its use upon or application to a curtain-bar, does not indent or disfigure either the bar or curtain, while at the same time the requisite interlock therewith is obtained, and accidental detachment when the clasp is pulled upon to draw the curtain down is avoided.

The clasp, as is obvious, is constructed without the use of rivets or solder; and it requires no screw or nut for attaching it to a curtain stick or bar; and it is cheap, efficient, and most quickly and easily applied and detached.

I am aware that a clasp for window-shade tassels has heretofore been made, and therefore I do not claim, broadly, a clasp for such purpose; but What I do claim is—

1. A clip, constructed of side jaws or plates A, hinged together and provided with an inward-projecting flange or lip, *e*, substantially as and for the purpose described.

2. A clasp, consisting of the jaws or plates A and the spring B, united together by means of the lips *a*, all substantially as shown and specified.

The above specification of my invention signed by me this 6th day of December, A. D. 1872.

F. MÜLLER.

Witnesses:

ALBERT W. BROWN,
JOHN P. MCELROY.